US012738639B2

(12) United States Patent
Bressner et al.

(10) Patent No.: US 12,738,639 B2
(45) Date of Patent: Sep. 15, 2026

(54) RADIATOR UNIT FOR CROSS-BAND SUPPRESSION

(71) Applicant: Telefonaktiebolaget LM Ericsson (publ), Stockholm (SE)

(72) Inventors: Thomas Bressner, Töging am Inn (DE); Michael Freiberger, Rosenheim (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 121 days.

(21) Appl. No.: 18/708,651

(22) PCT Filed: Nov. 12, 2021

(86) PCT No.: PCT/EP2021/081536
§ 371 (c)(1),
(2) Date: May 9, 2024

(87) PCT Pub. No.: WO2023/083462
PCT Pub. Date: May 19, 2023

(65) Prior Publication Data
US 2025/0015489 A1 Jan. 9, 2025

(51) Int. Cl.
*H01Q 1/52* (2006.01)
*H01Q 1/24* (2006.01)
*H01Q 21/26* (2006.01)

(52) U.S. Cl.
CPC ............. *H01Q 1/521* (2013.01); *H01Q 1/246* (2013.01); *H01Q 21/26* (2013.01)

(58) Field of Classification Search
CPC ........ H01Q 1/521; H01Q 1/246; H01Q 21/26; H01Q 9/285; H01Q 5/307; H01Q 21/24; H01Q 1/38
See application file for complete search history.

(56) References Cited

U.S. PATENT DOCUMENTS 9,912,076 B2 3/2018 Bisiules
10,547,110 B1 1/2020 Isik et al.
(Continued)

FOREIGN PATENT DOCUMENTS

CN 112490651 A 3/2021
CN 113506981 A 10/2021
JP 2013074508 A 4/2013

OTHER PUBLICATIONS

Sun, Hai-Han, et al., "Suppression of Cross-Band Scattering in Multiband Antenna Arrays," IEEE Transactions on Antennas and Propagation, vol. 67, Issue 4, Apr. 2019, pp. 2379-2389.
(Continued)

*Primary Examiner* — Renan Luque
(74) *Attorney, Agent, or Firm* — Withrow & Terranova, PLLC

(57) ABSTRACT

We describe a radiator unit for an antenna. The radiator unit is configured to radiate electromagnetic waves within a frequency band. The radiator unit comprises: a first radiating structure for radiating an electromagnetic wave having a first frequency within the frequency band, and a non-radiating structure coupled to the first radiating structure. One or both of (i) the first radiating structure comprises a first corrugation arranged on a first planar structure of the radiator unit, and (ii) the non-radiating structure comprises a second corrugation arranged on a second planar structure of the radiator unit.

20 Claims, 18 Drawing Sheets

(56) References Cited

U.S. PATENT DOCUMENTS

| | | | | |
|---|---|---|---|---|
| 11,018,437 | B2 | 5/2021 | Tang et al. | |
| 2008/0204331 | A1 | 8/2008 | Shtrom | |
| 2014/0125543 | A1 | 5/2014 | Chen et al. | |
| 2020/0328533 | A1 | 10/2020 | Sundararajan et al. | |
| 2021/0359414 | A1* | 11/2021 | Sundararajan | H01Q 1/521 |
| 2021/0367328 | A1* | 11/2021 | Ai | H01Q 19/108 |
| 2022/0037779 | A1* | 2/2022 | Chen | H01Q 1/50 |
| 2023/0065251 | A1* | 3/2023 | Wayton | H01Q 1/246 |

OTHER PUBLICATIONS

International Search Report and Written Opinion for International Patent Application No. PCT/EP2021/081536, mailed Aug. 1, 2022, 12 pages.

* cited by examiner

RADIATOR UNIT FOR CROSS-BAND SUPPRESSION

This application is a 35 U.S.C. § 371 national phase filing of International Application No. PCT/EP2021/081536, filed Nov. 12, 2021, the disclosure of which is incorporated herein by reference in its entirety.

TECHNICAL FIELD

The present disclosure generally relates to a radiator unit for an antenna, which may allow, in some examples, cross-band suppression/scattering reduction with corrugated transmission lines.

BACKGROUND

As there is the need for more compact antenna arrays, stacked antenna and multi-band antenna systems are currently under development. In the example of stacked antenna systems, the radiators are placed above each other (in a radiation direction of the respective radiators), while the radiators on the top have to be electrically transparent for the radiators beneath.

Such antenna arrays may use, for example, a dual-polarized loop dipole, as is shown in FIG. 1. In this example, the loop dipole 100 (which may operate at low-band frequencies of, for example, below 1.4 GHZ, e.g. between 698 MHz and 960 MHz) comprises dipole elements 102 and may be, for example, stacked on top of a holder via the holes 104. Slides 106 are provided for feeding points when the loop dipole 100 is connected to a vertical balun (not shown).

By doing so, cross-band scattering may arise, in which energy radiated by a first radiator may be scattered via one or more other radiators and/or the energy may be absorbed by the one more other radiators. Due to its structure with a metal surface on top of the radiator, and since no resonance structures are provided, pattern distortion of radiators located beneath the shown structure may occur.

FIG. 2 shows a further example of a dual-polarized loop dipole 200 in which the dipole elements 202 are thinner compared to the dipole elements 102, with the aim of reducing cross-band scattering.

There are solutions presented in, e.g., "Suppression of Cross-Band Scattering in Multiband Antenna Arrays" by H.-H. Sun et al., IEEE Transactions on Antennas and Propagation, vol. 67, no. 4, pp. 2379-2389 April 2019, and in U.S. Pat. No. 9,912,076 B2. These examples use resonance structures in order to mitigate the cross-band scattering of the radiators.

The use of resonance structures is effective due to their capability to filter specific frequency bands. Nevertheless, the current drawback of such structures is their bandwidth limitation. This means that the implementation allows suppressing sufficiently the cross-band scattering of a single frequency band. However, it is less feasible for multi-band suppression. Only a multi-band suppression structure allows stacking multiple antennas operating at different frequency bands.

A solution to allow multi-band suppression is presented in U.S. Pat. No. 11,018,437 B2, where the radiator arms are distinguished between each other. Two arms are electrically transparent for a first frequency band and the residual two arms are electrically transparent for a second frequency band. Hence, this allows having one column next to the top radiator transparent for a certain radiator that operates at the first frequency, while the column on the other side can be used for a different radiator operating at the second frequency.

Further prior art can be found in, for example, US 2020/0328533 A1, which generally relates to a low-cost high-performance multiband cellular antenna with a cloaked monolithic metal dipole, in which a low band dipole has dipole arms formed of a stamped sheet metal that has a plurality of slots, and in U.S. Pat. No. 10,547,110 B1, which generally relates to cloaked low band elements for multiband radiating arrays.

SUMMARY

Accordingly, there is a need to provide solutions in particular to enhance cross-band suppression in an antenna.

According to a first aspect, there is provided a radiator unit for an antenna. The radiator unit is configured to radiate electromagnetic waves within a frequency band. The radiator unit comprises a first radiating structure for radiating an electromagnetic wave having a first frequency within the frequency band, and a non-radiating structure coupled to the first radiating structure. One or both of (i) the first radiating structure comprises a first corrugation arranged on a first planar structure of the radiator unit, and (ii) the non-radiating structure comprises a second corrugation arranged on a second planar structure of the radiator unit.

The corrugation provided in one or both of the first radiating structure and the non-radiating structure allows the respective structure to be transparent (scarce) for electromagnetic waves with higher frequencies (that is above a predefined frequency threshold) and non-transparent (solid) for lower frequencies (that is below the predefined frequency threshold). This may allow for implementing in particular a (low-band) radiator which is electrically transparent at higher frequencies (that is above the predefined frequency threshold). Such a radiator unit may thus allow for a transparency behavior over a wide bandwidth.

The first and/or second planar structure may comprise, for example, a non-metallic surface, a printed circuit board, or other planar surfaces of the radiator unit and/or generally of the antenna.

The radiator unit/radiating structure may take different forms, for example, but not limited to a loop dipole, a cross dipole, etc.

In some examples of the radiator unit, the non-radiating structure comprises a feeding structure (for example a balun) electrically coupled to the first radiating structure. The feeding structure is, in these examples, configured to provide an electrical signal to the first radiating structure for the first radiating structure to radiate the electromagnetic wave having the first frequency. In examples in which the non-radiating structure comprises a second corrugation, the feeding structure comprising the corrugation may allow the feeding structure to be transparent to frequencies above the frequency threshold.

In some examples of the radiator unit, the first corrugation comprises a first plurality of protrusions formed on the first planar structure. The protrusions of the first plurality of protrusions are spaced apart from and electrically coupled to each other. One or more of the length of the protrusions, the width of the protrusions and the spacing between the protrusions may be chosen depending on the operating frequency of the radiator unit or the antenna. Providing protrusions for implementing the corrugation therefore allows for a flexible approach in the antenna design while aiming to improve cross-band suppression.

In some examples of the radiator unit, the second corrugation comprises a second plurality of protrusions formed on the second planar structure. The protrusions of the second plurality of protrusions are spaced apart from and electrically coupled to each other. Again, one or more of the length of the protrusions, the width of the protrusions and the spacing between these protrusions may be chosen depending on the operating frequency of the radiator unit or the antenna. Providing protrusions for implementing the corrugation allows for a flexible approach in the antenna design while aiming to improve cross-band suppression.

In some examples of the radiator unit, one or more of a length of the protrusions of the first and/or second plurality of protrusions, a width of the protrusions of the first and/or second plurality of protrusions, and a distance between neighboring protrusions of the first and/or second plurality of protrusions vary amongst the protrusions of the first and/or second plurality of protrusions. This allows for resonance structures with different resonance properties to be implemented in the radiator unit and/or the antenna given the variation of the design of the corrugation(s).

In some examples of the radiator unit, a spacing between neighboring protrusions of the first plurality of protrusions and/or the second plurality of protrusions defines a transparency of the first radiating structure and/or the non-radiating structure to an electromagnetic wave having a frequency within the frequency band. Generally, the smaller the spacing between neighboring protrusions, the higher the frequency of the electromagnetic wave needs to be in order for the structure having those protrusions to be transparent to the electromagnetic wave.

In some examples, the radiator unit further comprises a transmission line. The protrusions of the first plurality of protrusions are electrically coupled to each other via the transmission line. This allows for a thin transmission line (for example having a thickness of less than 1 mm, in particular less than 0.8 mm) to connect the protrusions so as for the radiator unit being more transparent to electromagnetic waves having frequencies within the frequency band. The protrusions of the first plurality of protrusions may extend from the transmission line.

Throughout the present disclosure, the corrugation elements/protrusions may have a width of, e.g., 1.2 mm, 1.3 mm, 1.4 mm, 1.5 mm, 1.6 mm, 1.7 mm, or 1.8 mm, and/or the corrugation elements/protrusions may have a spacing of, e.g., 3.0 mm, 3.1 mm, 3.2 mm, 3.3 mm, 3.4 mm, or 3.5 mm, and/or the corrugation elements/protrusions may have a length of 4.0 mm, 4.1 mm, 4.2 mm, 4.3 mm, 4.4 mm, 4.5 mm, 4.6 mm, 4.7 mm, 4.8 mm, 4.9 mm, 5.0 mm.

In some examples of the radiator unit, the protrusions of the first plurality of protrusions are arranged on multiple sides of the transmission line, thereby in particular improving transparency to electromagnetic waves having frequencies within the frequency band. The corrugation design allows for more flexibility in relation to resonance structures being provided between the protrusions.

In some examples of the radiator unit, the protrusions of the first plurality of protrusions are arranged at least partially alternately on two sides of the transmission line, providing for a different design for allowing resonance structures to be provided between the protrusions.

In some examples of the radiator unit, one or both of the transmission line and the protrusions of the first plurality of protrusions have a thickness of less than 1 millimeter, in particular less than 0.8 millimeter.

In some examples of the radiator unit, one or both of the transmission line and the protrusions of the first plurality of protrusions have a thickness of less than c/(f*100). c is the speed of light in vacuum, and f is the first frequency or another frequency within the frequency band. This allows in particular improving transparency to electromagnetic waves having frequencies within the frequency band.

In some examples of the radiator unit, the first corrugation comprises a first metal corrugation.

In some examples of the radiator unit, the second corrugation comprises one or both of a second metal corrugation and a second dielectric corrugation.

Both of a metal corrugation and a dielectric corrugation allow for cross-band suppression in view of these structures being transparent to electromagnetic waves having a frequency within the frequency band.

In some examples of the radiator unit, one or both of the first corrugation and the second corrugation are transparent for an electromagnetic wave having a frequency above a frequency threshold within the frequency band and are shielding for an electromagnetic wave having a frequency below the frequency threshold.

In some examples, the radiator unit further comprises a resonance structure arranged on one or both of the first planar structure and the second planar structure for cross-band scattering suppression. Providing the first and/or second corrugation allows for a flexible arrangement of the resonance structure (or resonance structures) on the radiator unit and/or on the antenna in general.

In some examples of the radiator unit, one or both of the first corrugation and the second corrugation are comprised in or formed on a printed circuit board. In these examples, one or more resonance structures may also be provided on the printed circuit board.

Throughout the present disclosure, the radiating structure may, in some examples, form the (entire) printed circuit board. The first and/or second corrugation may thus, in these examples, be integral to the printed circuit board.

In some examples, the radiator unit further comprises a second radiating structure for radiating an electromagnetic wave having a second frequency within the frequency band, wherein the first radiating structure is transparent to the electromagnetic wave having the second frequency. The second radiating structure may thus be arranged on the antenna or on the radiator unit independently from a position of the first radiating structure since the first radiating structure does not scatter or absorb an electromagnetic wave emitted by the second radiating structure.

In some examples of the radiator unit, the second frequency is higher than the first frequency. The first corrugation and/or the second corrugation may hereby be transparent to an electromagnetic wave having the second frequency, thereby avoiding or reducing cross-band scattering.

In some examples of the radiator unit, the first radiating structure and the second radiating structure are arranged such that the first radiating structure physically covers at least partially a radiation direction of the electromagnetic wave having the second frequency radiatable by the second radiating structure. The first corrugation and/or the second corrugation may hereby be transparent to an electromagnetic wave having the second frequency, thereby avoiding or reducing cross-band scattering.

In some examples, the radiator unit further comprises a reflector on which the first radiating structure and the second radiating structure are arranged. The radiation direction faces away from a side at which the first radiating structure and the second radiating structure are arranged on the reflector. Again, the first radiating structure may hereby be transparent to an electromagnetic wave radiated by the second radiating structure in view of the first and/or second corrugation.

In some examples, the radiator unit comprises a plurality of said first radiating structures. Each one of the plurality of first radiating structures comprises a corresponding, respective first corrugation. The radiating structures of the plurality of first radiating structures are arranged relatively to each other to obtain, independently from a location of the second radiating structure, a predefined radiation pattern of electromagnetic waves having the first frequency. This flexible arrangement of the plurality of first radiating structures may be provided in view of the first and/or second corrugation being transparent to an electromagnetic wave radiated by the second radiating structure.

In some examples, the radiator unit comprises a plurality of said second radiating structures. The radiating structures of the plurality of second radiating structures are arranged relatively to each other to obtain, independently from a location of the first radiating structure or radiating structures of the first plurality of radiating structures, a predefined radiation pattern of electromagnetic waves having the second frequency. This flexible arrangement of the plurality of second radiating structures may be provided in view of the first and/or second corrugation being transparent to an electromagnetic wave radiated by the second radiating structures.

In some examples of the radiator unit, the first radiating structure comprises one or more oval shaped radiating elements, and wherein the first corrugation is comprised in one or more of the oval shaped radiating elements. Such an oval-shaped radiating element may be in the form of, for example, a loop dipole. The gain of the radiator unit may thereby be improved compared to, for example, a cross dipole.

In some examples of the radiator unit, the non-radiating structure comprises a decoupling element for electromagnetically decoupling a plurality of radiating structures of the radiator unit. The decoupling element comprises the second corrugation. Furthermore, in some examples, the second corrugation may be provided on the decoupling element as well as on the feeding structure. Providing also the decoupling element with a corrugation allows for improving cross-band suppression in the antenna. The decoupling element may be used between two or more radiating structures to block the radiation from each other, which may reduce the mutual coupling.

In some examples of the radiator unit, the non-radiating structure comprises a partition wall for partitioning one or more radiating structures of the antenna from one or more other radiating structures of the antenna. The partition wall comprises the second corrugation. Furthermore, in some examples, the second corrugation may be provided on the partition wall as well as on the feeding structure. Providing also the partition wall with a corrugation allows for improving cross-band suppression in the antenna.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
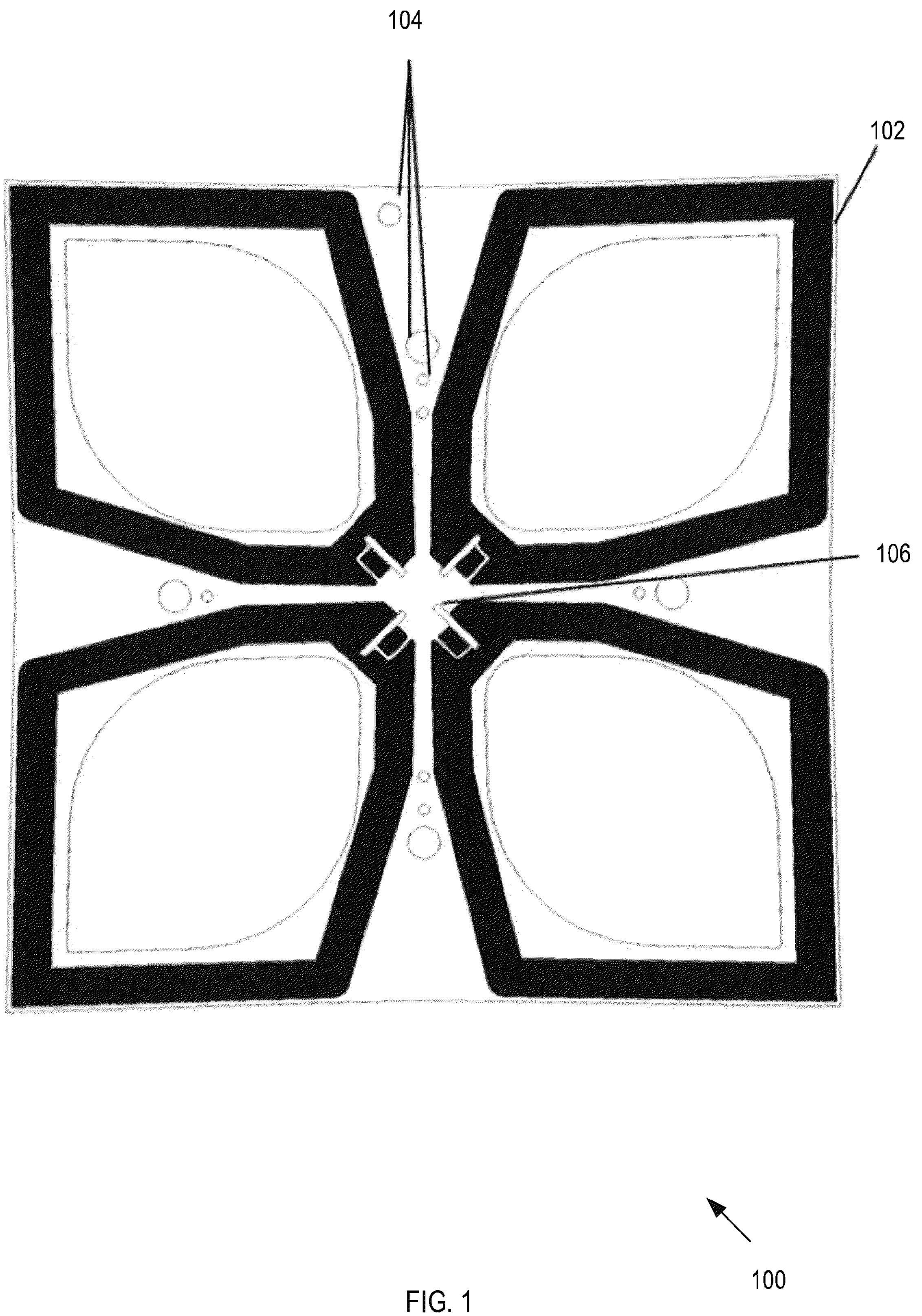
FIG. 1 (Prior art)
FIG. 1 shows a top view of a schematic illustration of a dual-polarized loop dipole according to the prior art.

In the following description, for purposes of explanation and not limitation, specific details are set forth in order to provide a thorough understanding of the present disclosure. It will be apparent to one of skill in the art that the present disclosure may be practiced in other embodiments that depart from these specific details.

The present disclosure generally relates to radiator unit for an antenna, wherein one or both of (i) a first radiating structure of the radiator unit comprises a first corrugation arranged on a first planar structure of the radiator unit, and (ii) a non-radiating structure of the radiator unit comprises a second corrugation arranged on a second planar structure of the radiator unit. The radiator unit may be part of an antenna, which may be provided on, for example, a base station. Using a corrugation allows for cross-band scattering reduction when using the antenna.

The inventors have realized that providing one or more corrugations overcomes the limitation of bandwidth limitation of cross-band scattering suppression. With the example implementations as described herein, not only a single-band of electromagnetic waves can travel through the radiator unit, but the radiator unit is transparent to multiple bands. Example implementations as described herein allow for stacking more radiators that operate at different frequency bands, which requires a multi-cross-band suppression. More compact stacked antenna arrays may thus be designed.

With multi-cross-band scattering suppression, it is possible to place a wide range of radiators beneath the same top radiator and allow a much higher degree of interchangeability. With the solutions presented herein, different radiators may be arranged beneath a top radiator, without a restriction as to the lower-lying radiators being arranged on a specific side of the top radiator or a particular location. Therefore, even triple-band stacked antenna systems are possible using the radiator unit according to the present disclosure, whereby radiators operate at various frequency bands.

In some examples as outlined herein, for a multi-cross-band scattering suppression, the metallic radiating structure is reduced by a corrugated pattern. Due to the gaps within this corrugated pattern, the structure is scarce (transparent) for higher frequencies (above a frequency threshold of, for example, 1.4 GHZ) with smaller wavelength and solid (non-transparent) for low frequencies (below the frequency threshold), where the wavelength is large. Implemented in, for example, a low-band radiator, it allows to properly radiate at lower frequencies (e.g. below 1.4 GHZ) while being electrically transparent at higher frequency bands (e.g. above 1.4 GHZ). This provides a transparency behavior over a wide bandwidth.

Furthermore, the implementation of the corrugated structure allows introducing one or more resonance structures by modifying the length and/or width and/or number of the corrugation elements. This may be valuable since one may tweak the operating frequency as well as create resonance structures for an improved suppression at certain frequency bands. This flexibility is helpful since, in some examples, not the entire frequency spectrum may be utilized and some frequency bands may be more of interest to be electrically transparent.

The corrugated structure may reduce the metallic structure to have an electrically transparent behavior over a wide bandwidth. Due to the gaps, as outlined above, the structure is transparent for higher frequencies (e.g. above 1.4 GHZ) with smaller wavelengths and (rather) non-transparent for lower frequencies (e.g. below 1.4 GHz), where the wavelength is large. Besides that, the corrugation may be used to create resonance structures for an additional narrow cross-band scattering suppression. This can be achieved, for example, by tweaking the length and/or width and/or number of corrugation elements. This modification may be applied independently to certain parts of the corrugated structure or to the entire corrugation.

By introducing a corrugation to this structure, the metalized surface is reduced.

Figure 3A:
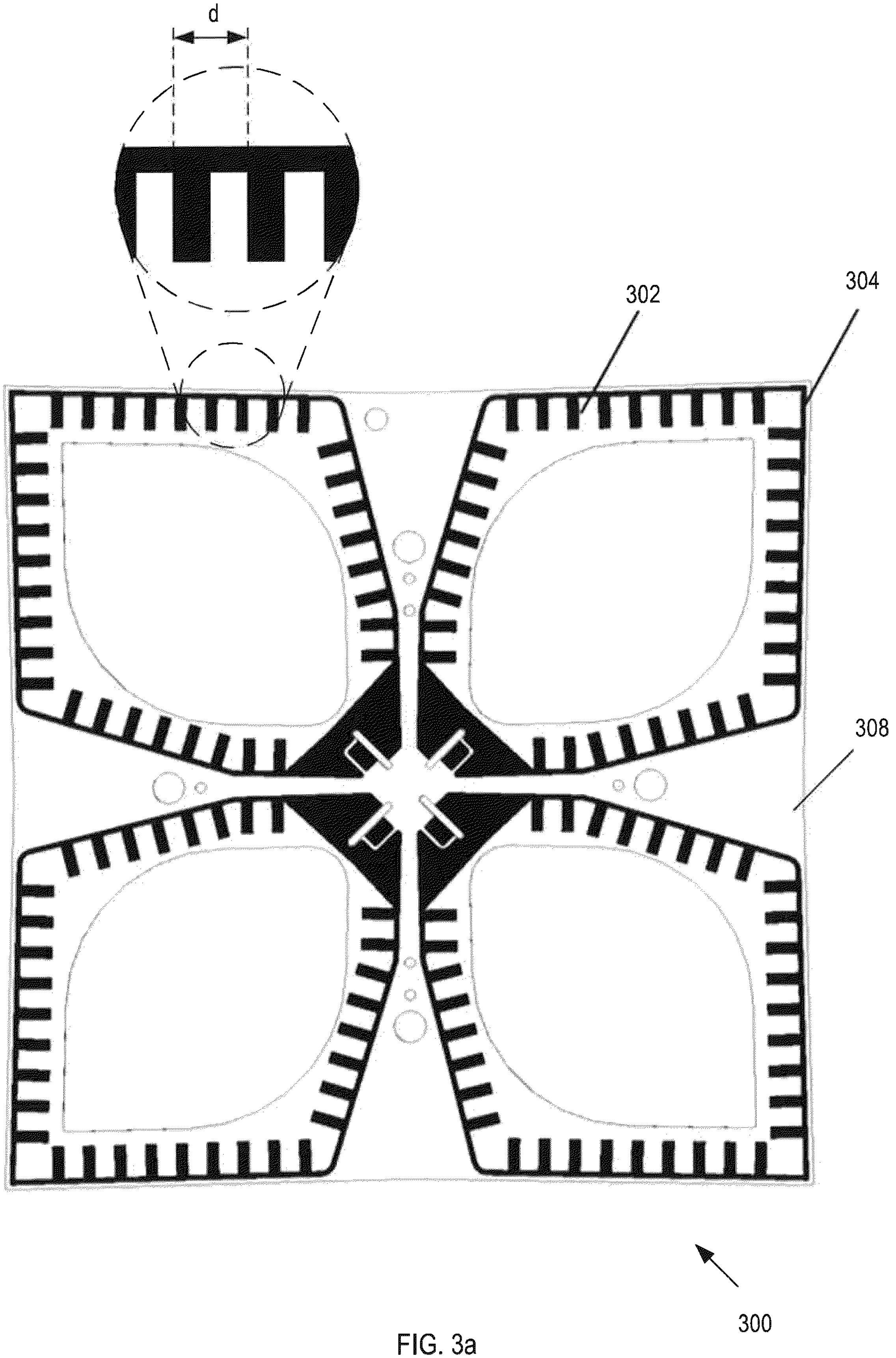
FIGS. 3*a* and *b* show top views of schematic illustrations of a dual-polarized loop dipole according to some example implementations as described herein.

FIG. 3*a* shows a top view of a schematic illustration of a dual-polarized loop dipole (radiating structure 300) with a singled-sided corrugation according to some example implementations as described herein.

The implementation of the corrugation 302 in this example is based on there being multiple corrugated metallic elements/protrusions, which have a certain length, width and spacing depending on the operating frequency of the radiating structure 300. For example, a larger spacing results in a lower operating frequency. In some examples, as is shown in FIG. 3*a*, a distance, d, may be defined between the corrugated elements/protrusions. The highest operating frequency, $f_1$, of the radiating structure correlates to a wavelength $\lambda_1$, with $c=f_1*\lambda_1$, where c is the speed of light. The center frequency, $f_2$, of the desired frequency band (cross-band) for which the radiating structure is transparent, correlates to a wavelength $\lambda_2$, with $c=f_2*\lambda_2$. A relationship between $\lambda_1$, $\lambda_2$, and the distance d may, in some examples, be defined as:

$$\lambda_2/20 < d < \lambda_1/20$$

All corrugated elements are, in this example, connected via the (dipole) transmission line 304.

Figure 2:
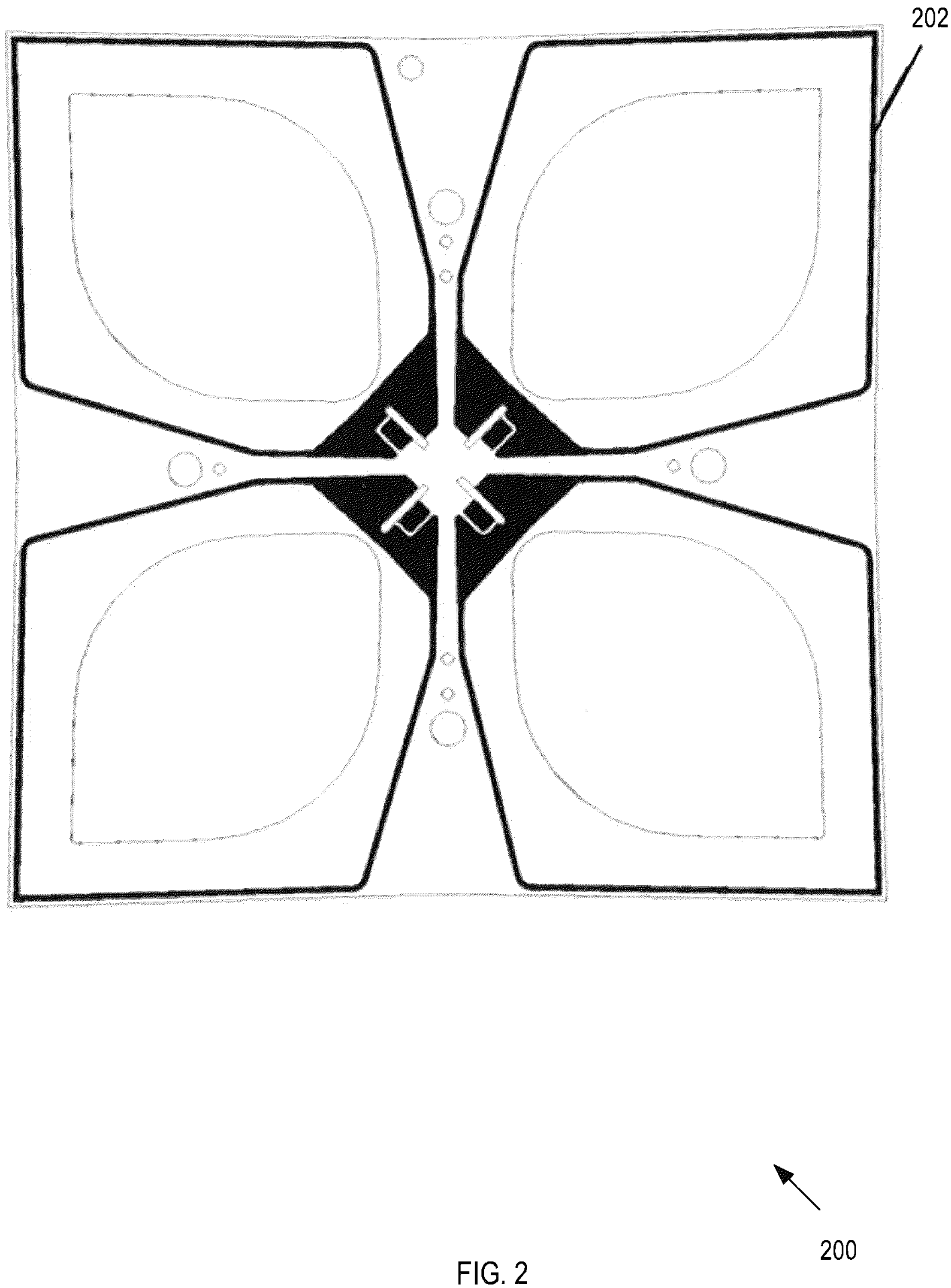
FIG. 2 (Prior art)
FIG. 2 shows a top view of a schematic illustration of a dual-polarized loop dipole according to the prior art.

Due to the decreasing wavelength with increasing frequency, this structure is scarcer (more transparent) for higher frequencies than for low frequencies. This allows designing the corrugation in such a way that the length, width and number of corrugations allow to properly radiate at the desired low-frequency band while being transparent at higher frequency bands. The loop dipole shown in FIG. 3 is thus more transparent for higher frequencies (e.g. above 1.4 GHZ) compared to, e.g., the example shown in FIG. 1. Nearly the same response of the loop dipole shown in FIG. 3 to electromagnetic waves is observed as for the loop dipole shown in FIG. 2, in which only a thin loop dipole is present.

This shows that the implementation of the corrugation reduces the cross-band scattering and makes the loop dipole electrically transparent as if it were just a thin (e.g. thinner in FIG. 2 by a factor of e.g. 0.5 or 0.1 than that of FIG. 3) wire. However, due to the corrugation elements/protrusions, flexibility is gained to tweak resonance frequencies and create (space/gaps for) a resonance structure (or resonance structures) for specific cross-band scattering suppression.

Figure 3B:
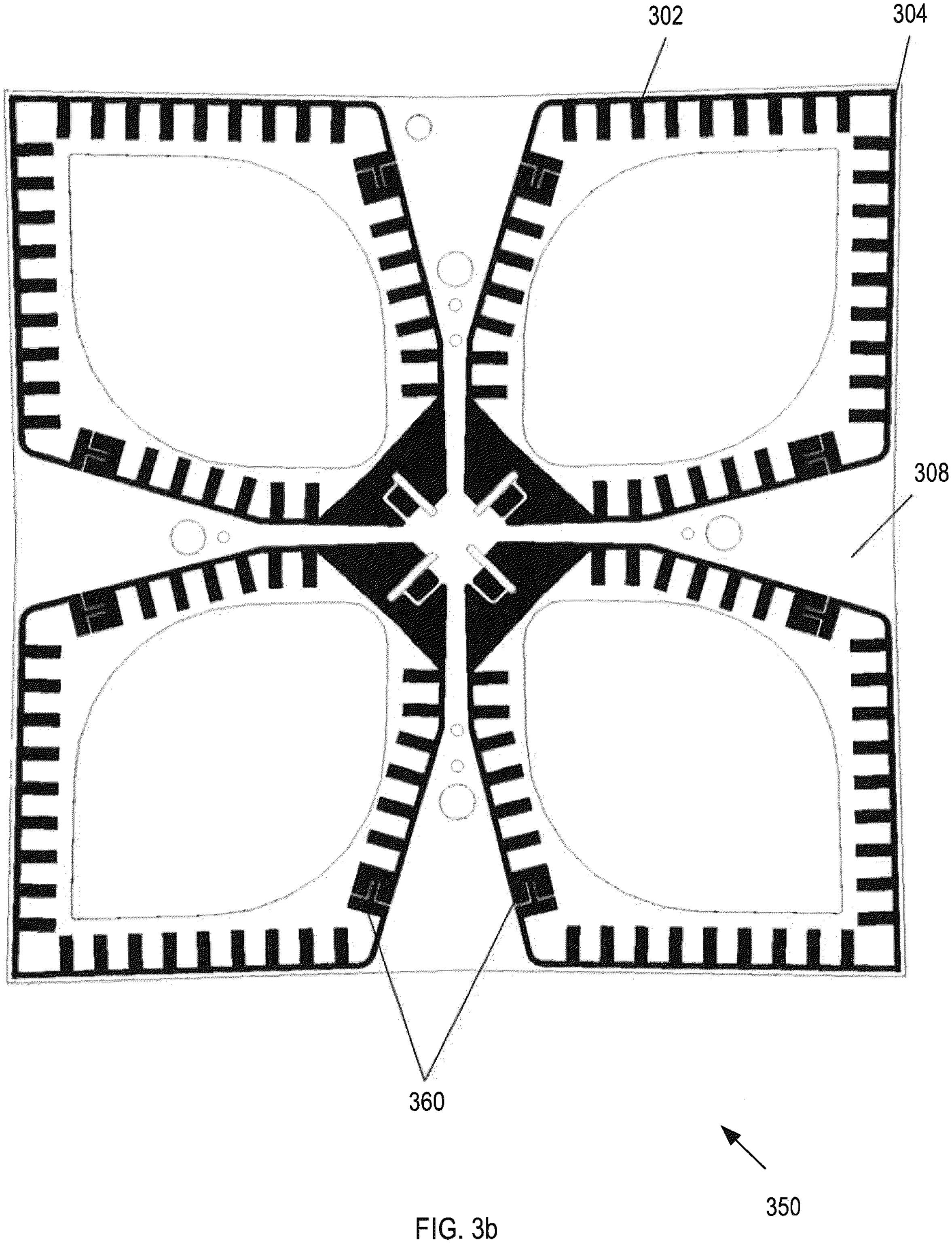

FIG. 3*b* shows a top view of a schematic illustration of a dual-polarized loop dipole (radiating structure 350) with a singled-sided corrugation according to some example implementations as described herein. In this example, resonance structures 360 are provided, as outlined above. The location and/or number and/or dimension(s) of the resonance structures 360 may vary. With the exception of the resonance structures 360, this example is identical to the one shown in FIG. 3*a*.

It is to be noted that all examples as outlined throughout the present disclosure may comprise one or more resonance structures, which may be electrically coupled to one or both of the first corrugation and the second corrugation.

The corrugation can be implemented in different ways and is not limited to be equidistant (e.g. equidistant protrusions), nor that every corrugation and/or protrusion of the corrugation has to have the same length or width. While FIG. 3 shows the implementation of edge corrugation, the corrugation can be applied alternating on both sides to increase the electrical length. Furthermore, it can be realized with a corrugation applied on both sides of the transmission line, as is shown in FIG. 4.

Figure 4:
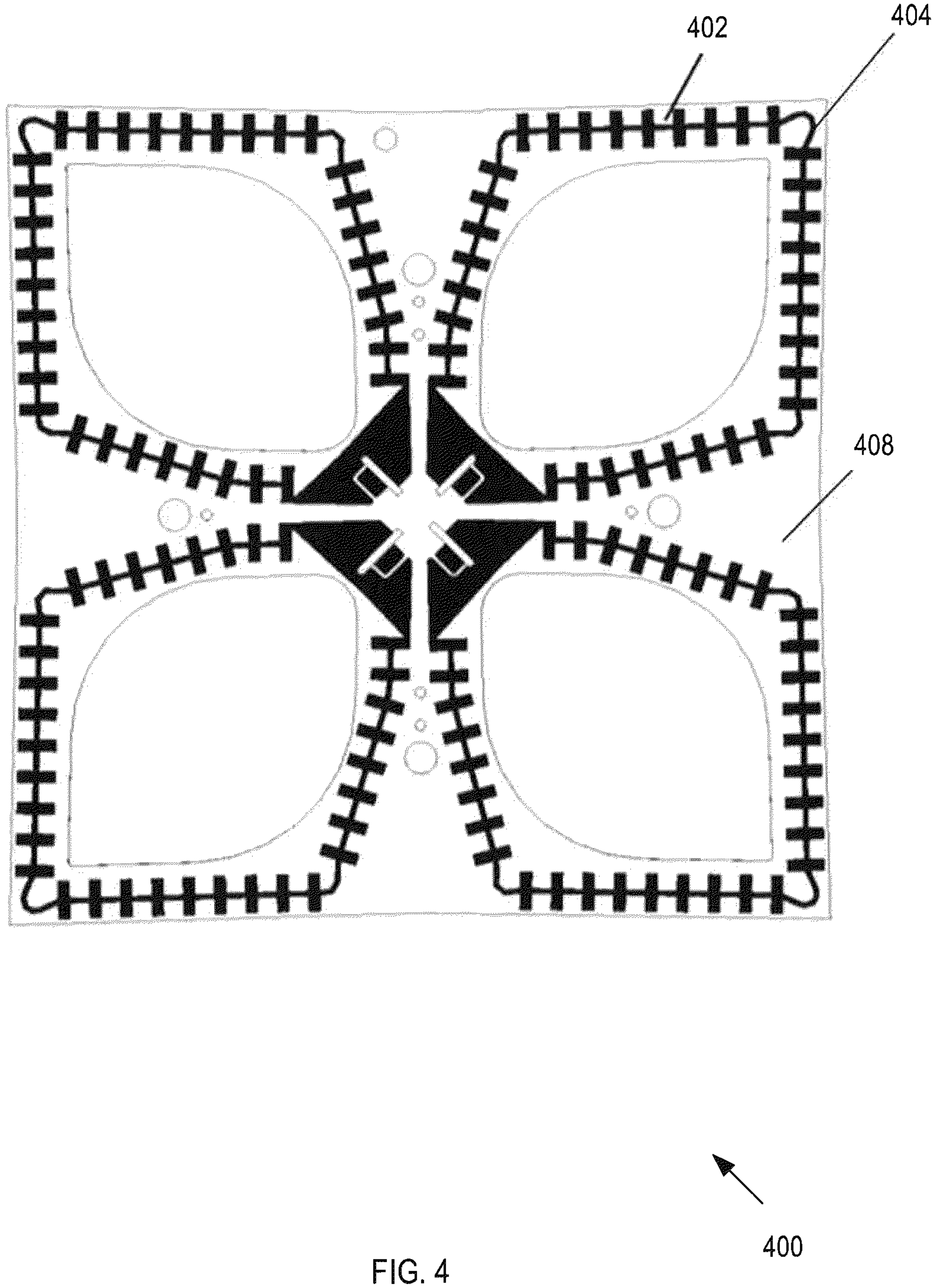
FIG. 4 shows a top view of a schematic illustration of a dual-polarized loop dipole according to some example implementations as described herein.

FIG. 4 shows a top view of a schematic illustration of a dual-polarized loop dipole (radiating structure 400) according to some example implementations as described herein. The corrugation 402 is implemented in the form of protrusions that are arranged on both sides of the transmission line 404.

The realization of the corrugation may depend on the space as well as on the radiator approach itself. Note that in the given example in FIG. 4, the circumference of the dipole has changed compared to that shown in FIG. 3.

The corrugation can be arranged in a different manner. For instance, the corrugation elements/protrusions can be modified in length and/or width and/or number to tweak resonances (e.g. allow gaps to be provided between the corrugation elements/protrusions, in which gaps the response structure(s) may be arranged).

In FIGS. 3*a/b* and 4, the corrugation elements may have, for example, a width of 1.8 mm and a spacing between the corrugation elements of 3 mm. The width may vary, e.g., between 1.5 mm and 2.0 mm, and/or the spacing may vary, e.g., between 2 mm and 3 mm. In this example, the length of the corrugation elements is 5 mm, but may vary, e.g., between 2 and 8 mm.

Figure 5:
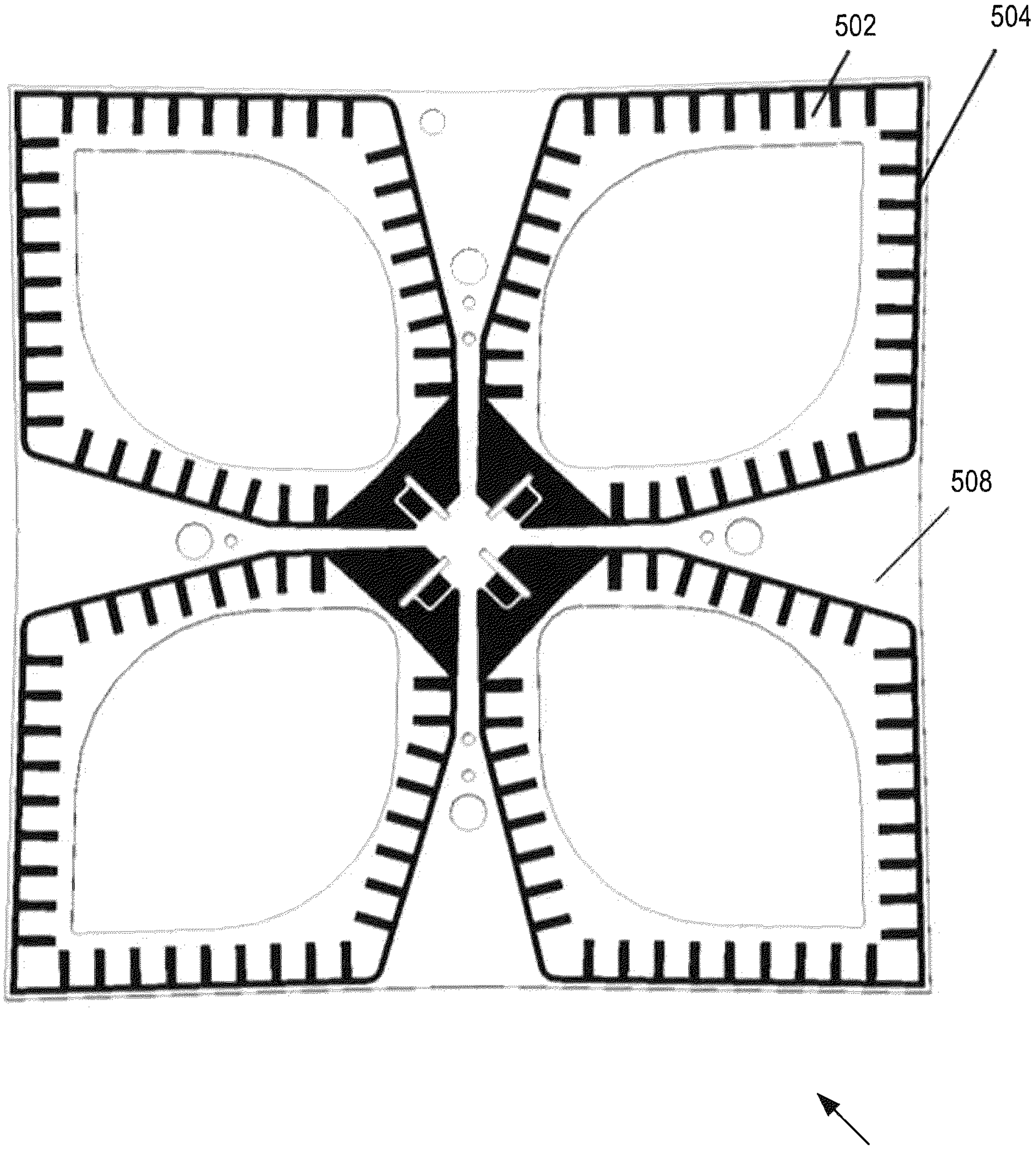
FIG. 5 shows a top view of a schematic illustration of a dual-polarized loop dipole according to some example implementations as described herein.

FIG. 5 shows a top view of a schematic illustration of a dual-polarized loop dipole (radiating structure 500) according to some example implementations as described herein. In this example, the loop dipole transmission line 504 is the same as in FIG. 3*a/b* or 4, but thinner corrugation elements/protrusions are formed for the corrugation 502 to push the operating frequency lower compared to that of FIG. 3*a/b* or 4. In the example of FIG. 5, the corrugation elements may have a width of 1.2 mm and a spacing between the corrugation elements of 3.5 mm. The width may vary, e.g., between 1.0 mm and 1.5 mm, and/or the spacing may vary, e.g., between 3 mm and 4 mm. In this example, the length of the corrugation elements is 5 mm, but may vary, e.g., between 2 and 8 mm.

In this example, the modification is applied on all elements. However, it is possible to use some elements/protrusions to create resonating elements (resonance structures) to improve the scattering reduction for specific frequencies. However, the broadband transparency is achieved by the corrugated approach, and the resonance elements may be used to improve the transparency locally.

Figure 6:
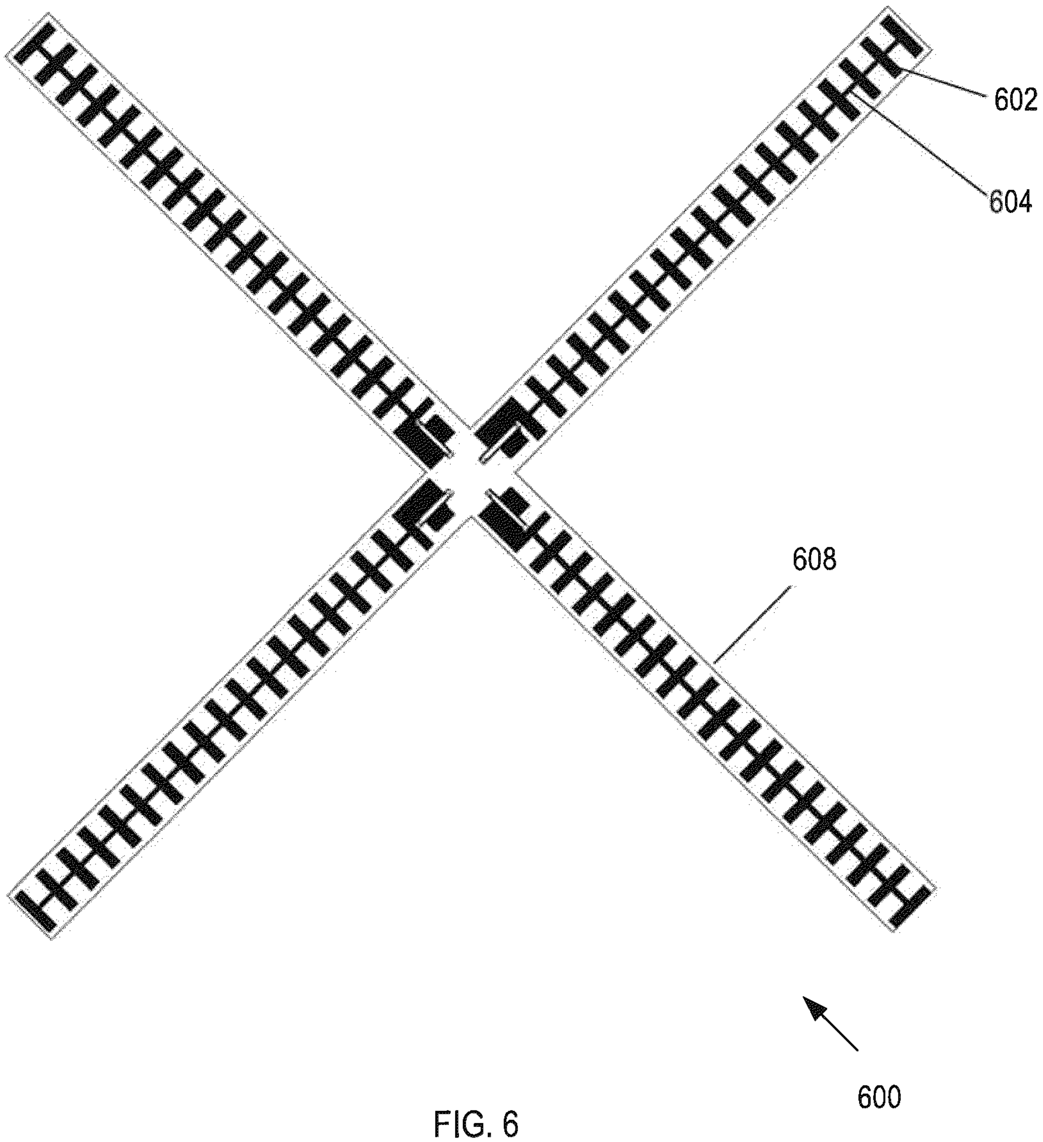
FIG. 6 shows a top view of a schematic illustration of a cross dipole according to some example implementations as described herein.

FIG. 6 shows a top view of a schematic illustration of a cross dipole (radiating structure) 600 according to some example implementations as described herein.

In this example, the corrugation 602 is formed from corrugation elements/protrusions which are arranged on the respective arms of the cross dipole. The corrugation elements/protrusions are coupled to each other via the transmission line 604. While the corrugation pattern is the same on each arm in this example, different corrugation patterns may be provided on different arms in other examples.

Figure 7:
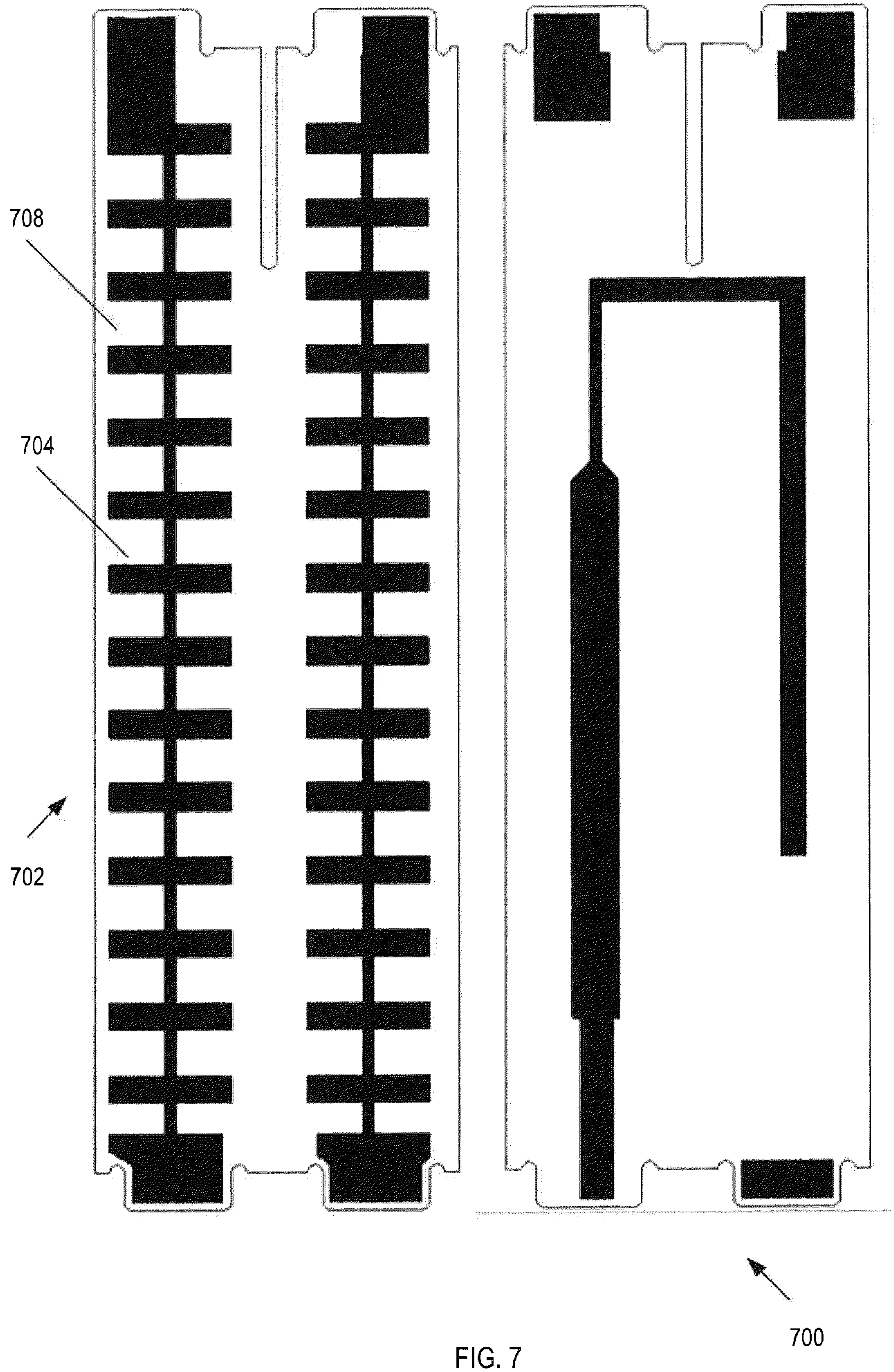
FIG. 7 shows a cross-sectional view of a schematic illustration of a balun according to some example implementations as described herein.
Figure 8A:
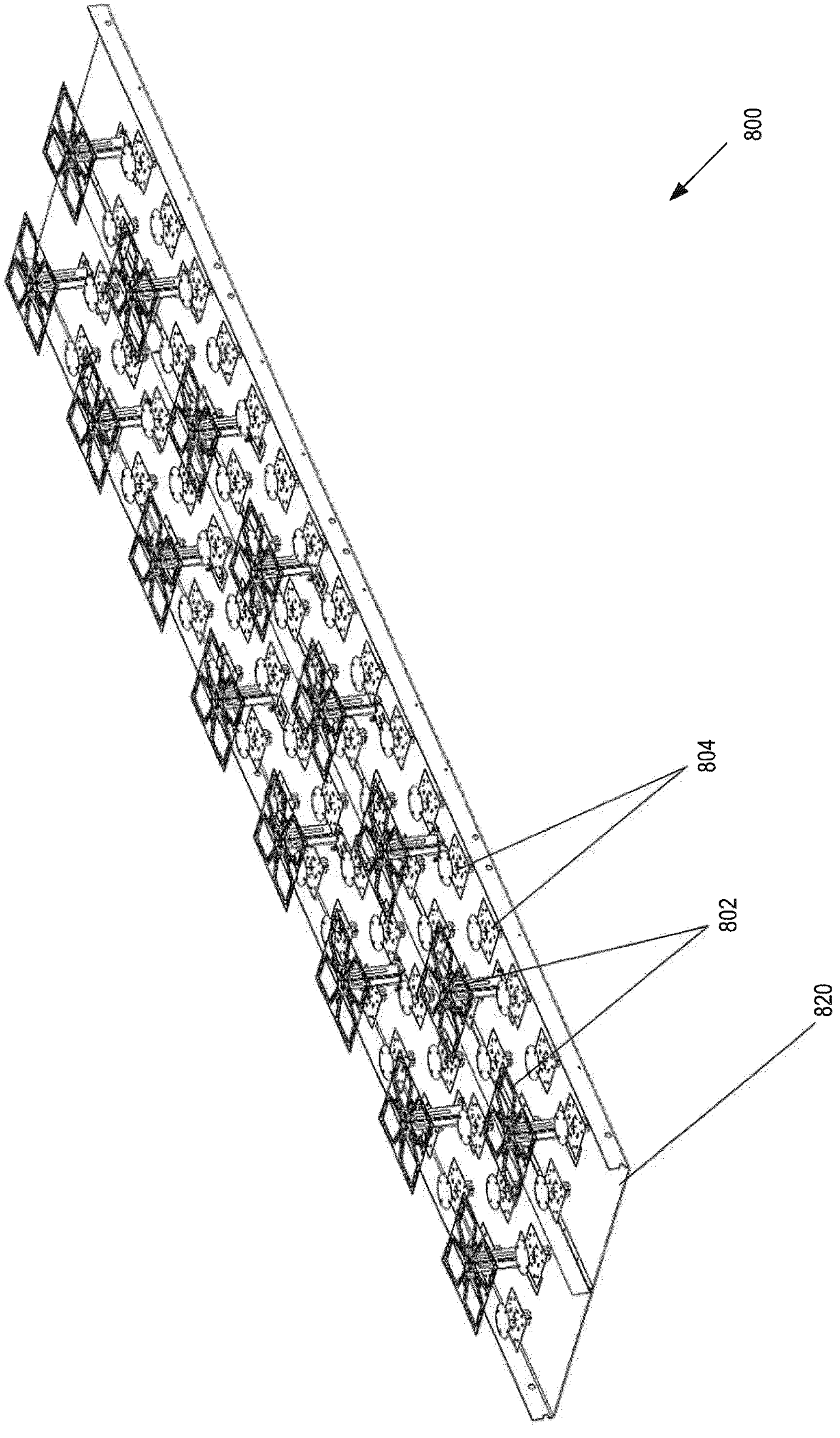
FIGS. 8*a* to *f* show different views of a schematic illustration of an antenna according to some example implementations as described herein.
Figure 8B:
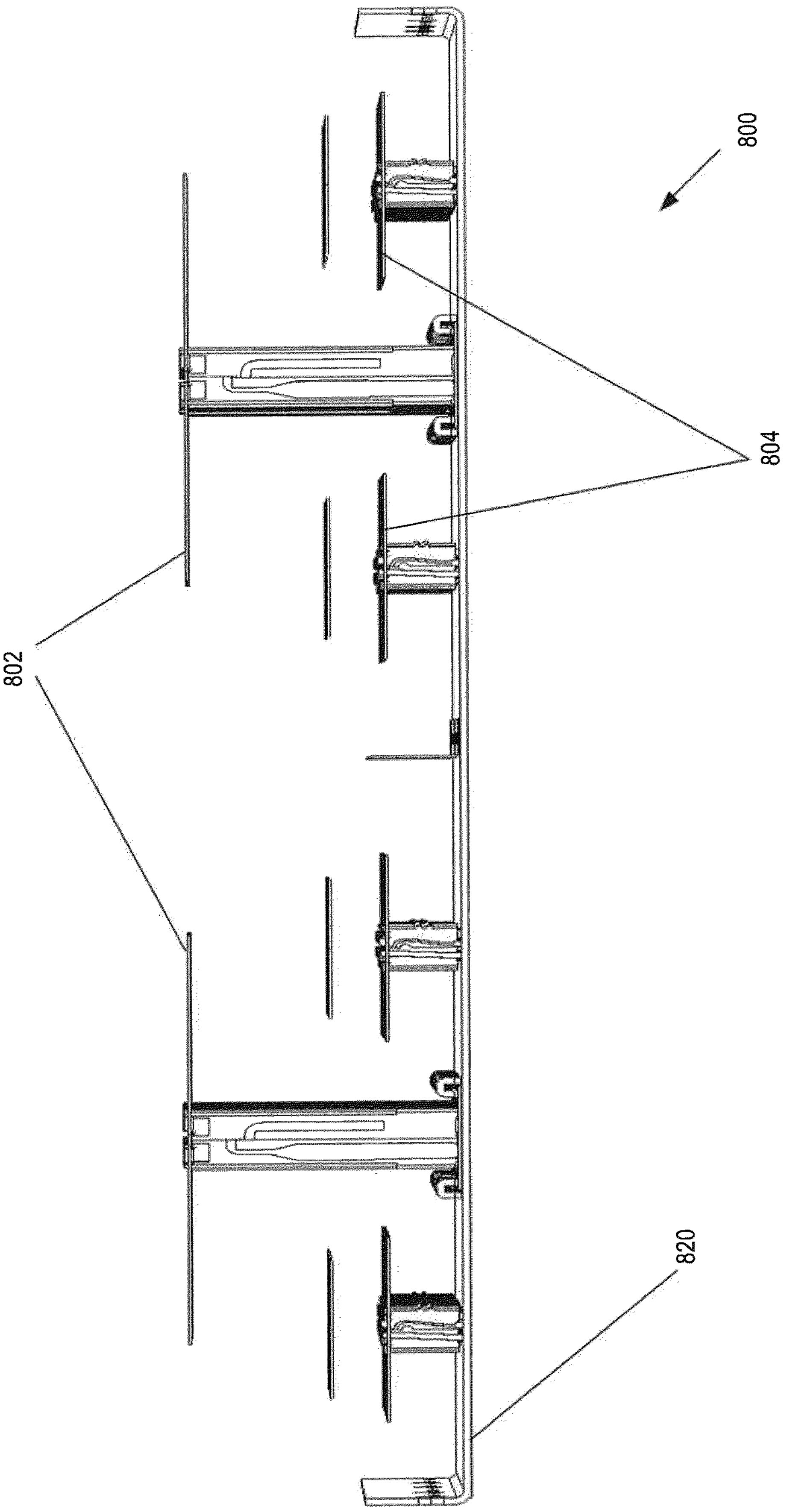
Figure 8C:
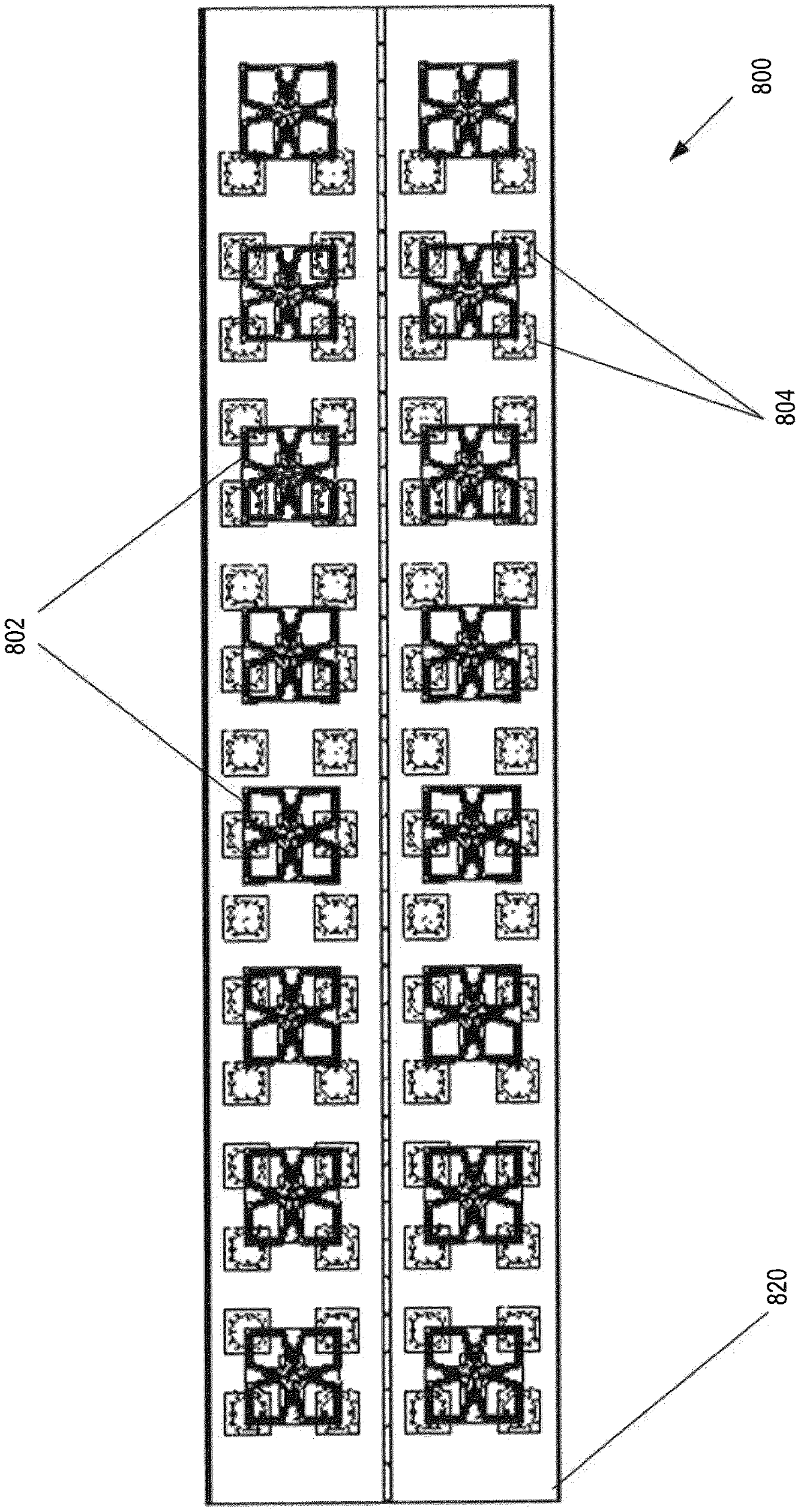
Figure 8D:
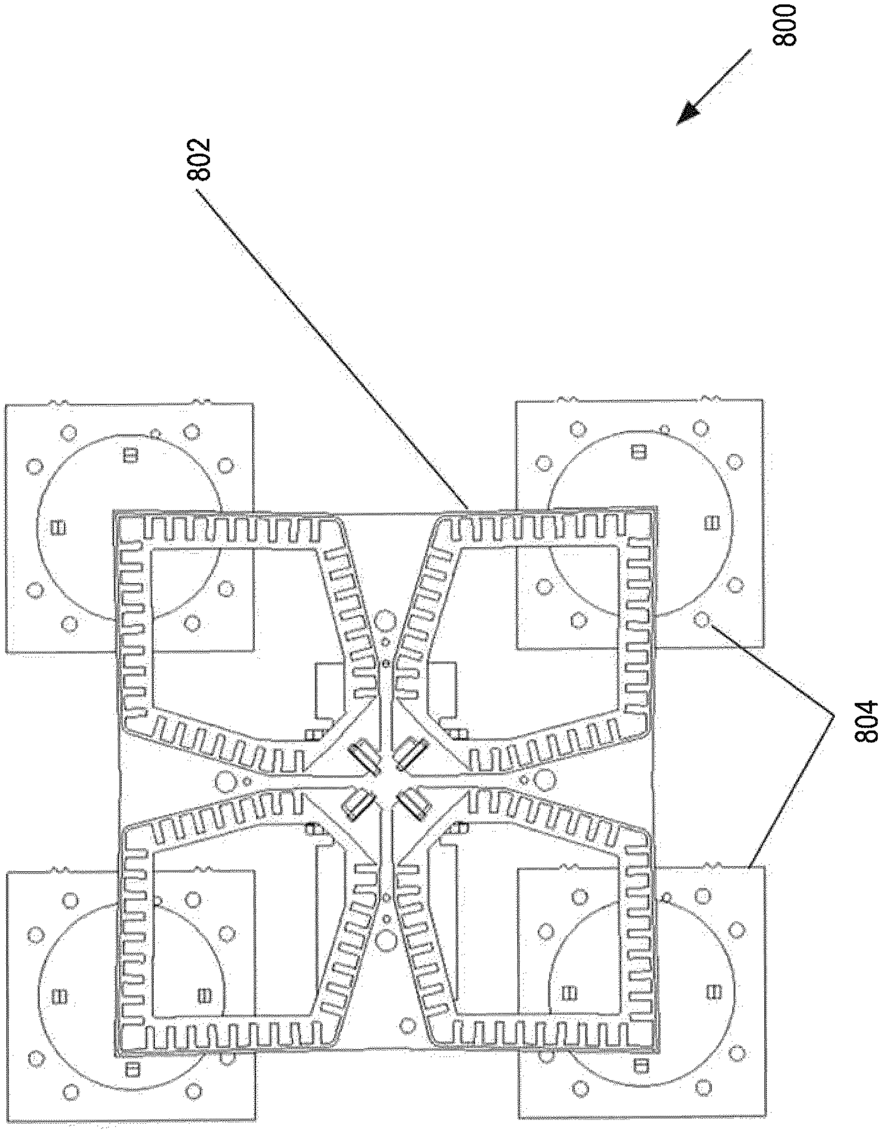
Figure 8E:
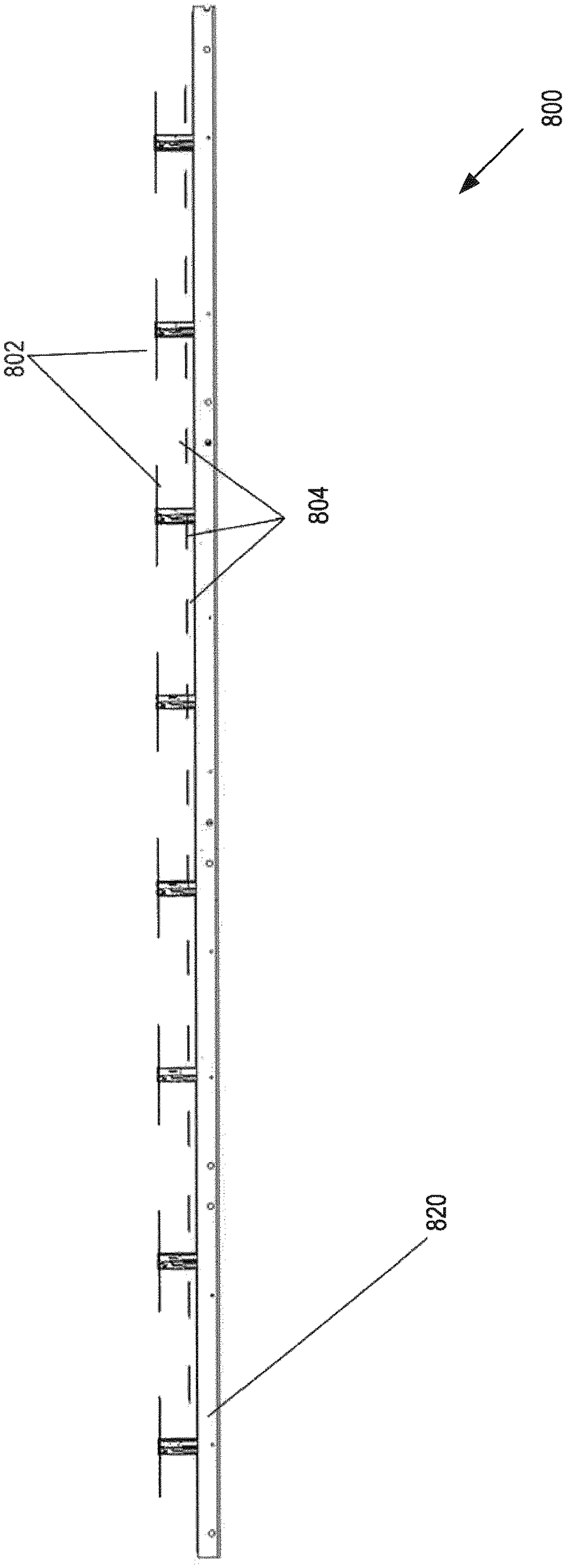
Figure 8F:
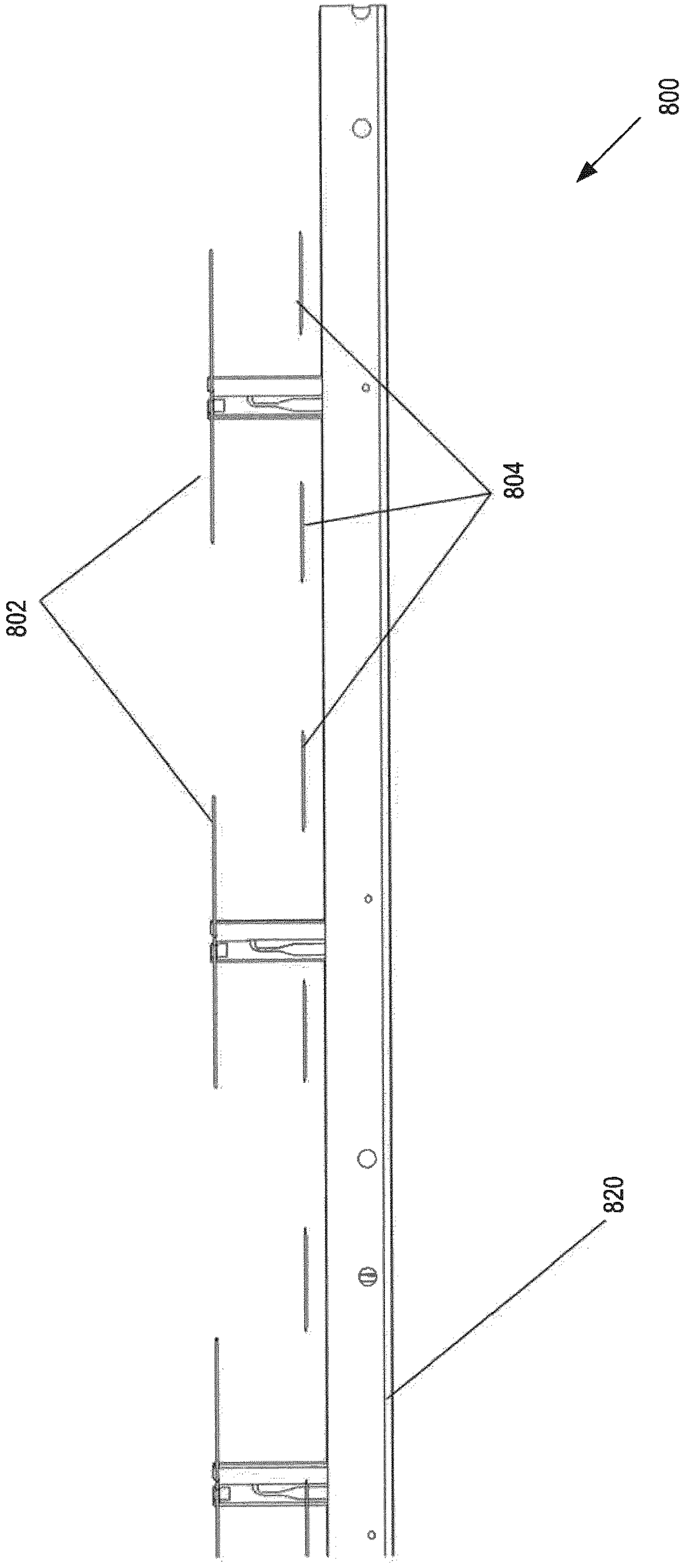
Figure 9A:
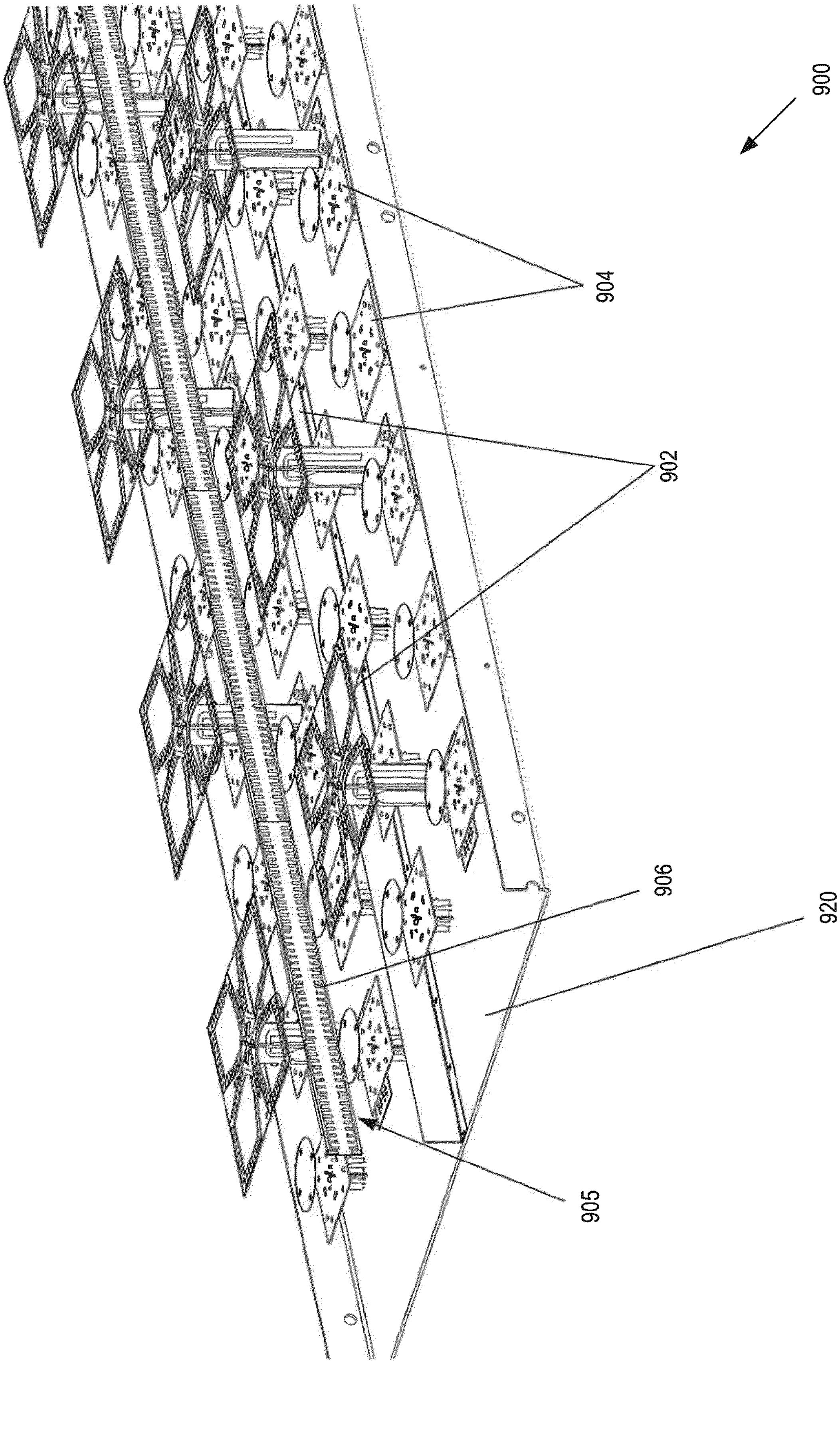
FIGS. 9*a* to *d* show different views of a schematic illustration of an antenna according to some example implementations as described herein.
Figure 9B:
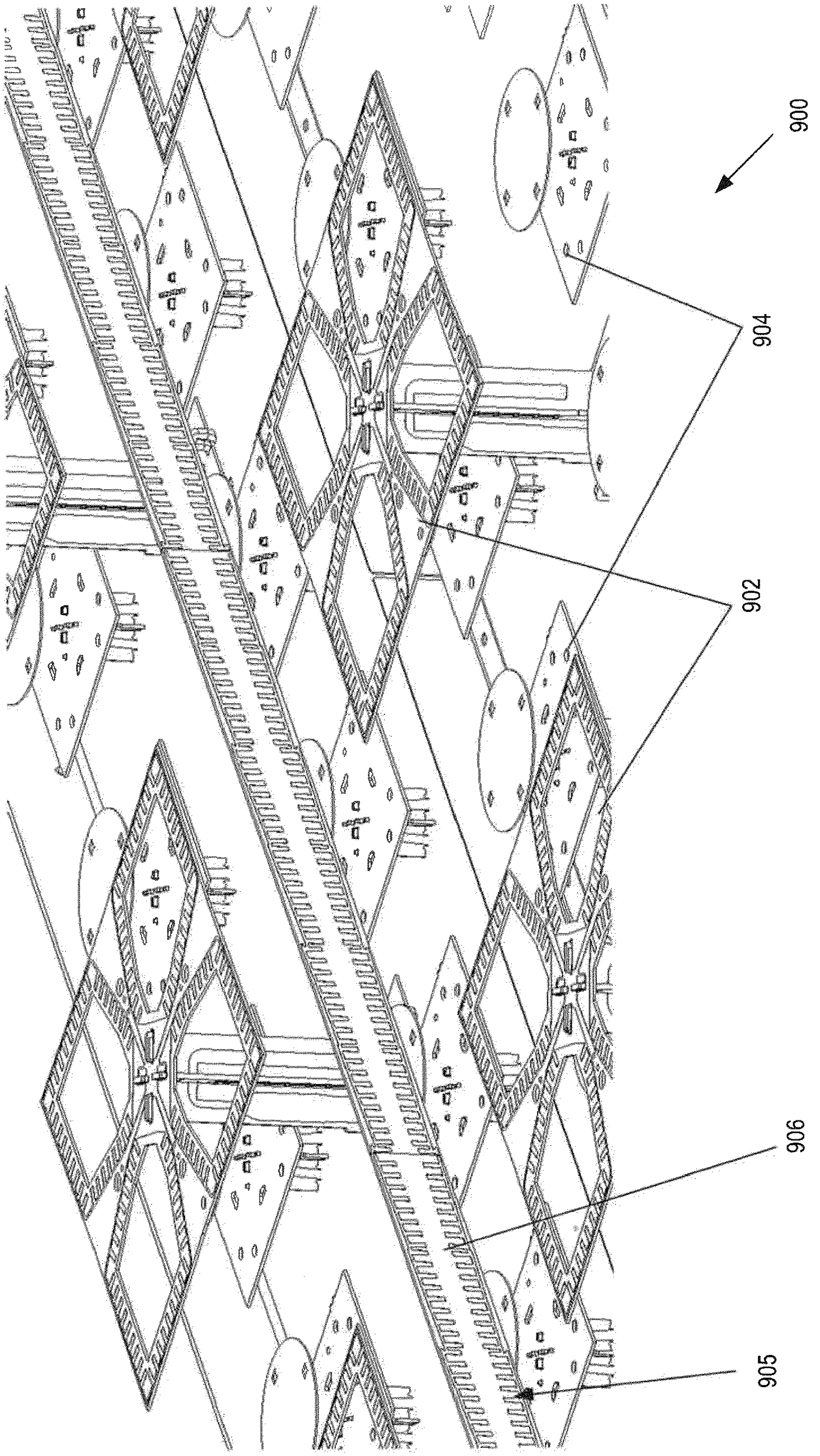
Figure 9C:
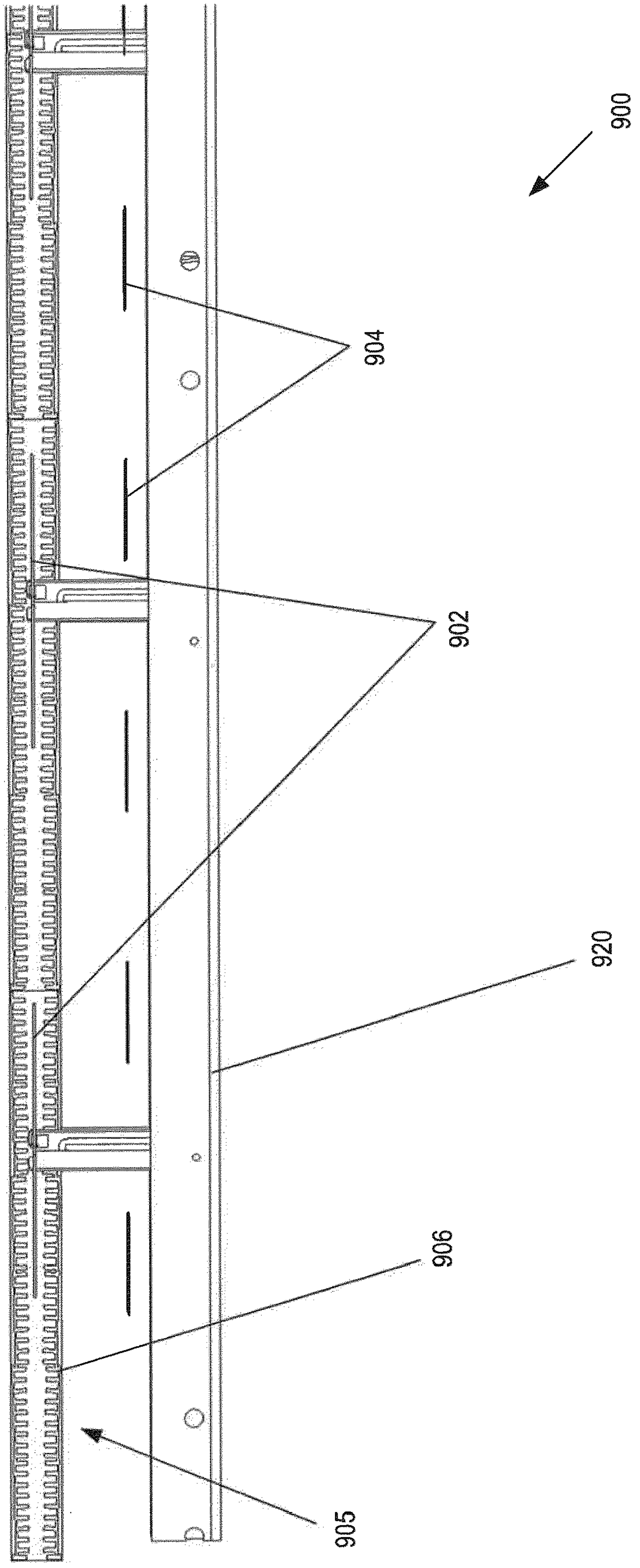
Figure 9D:
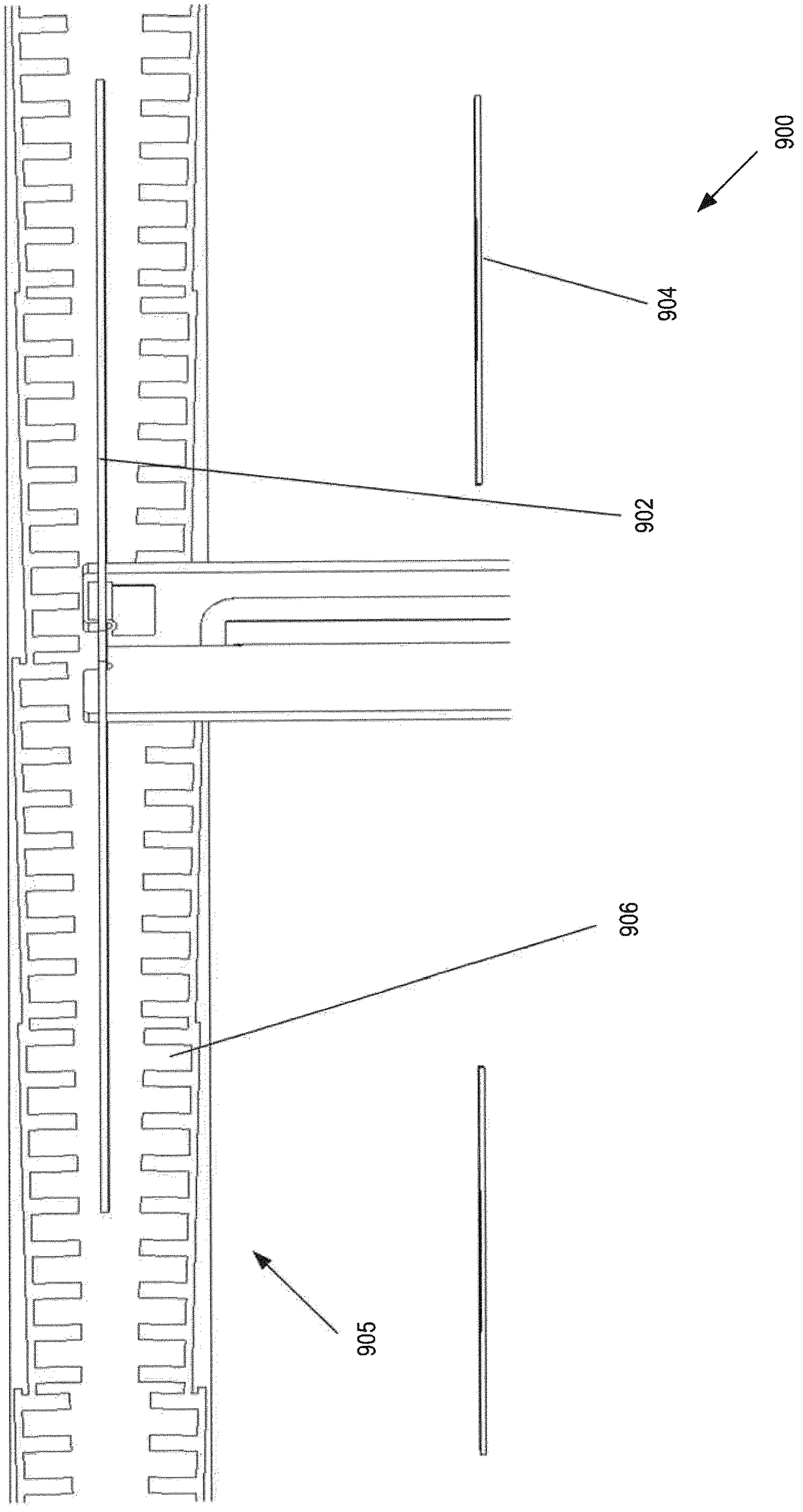

FIG. 7 shows a cross-sectional view of a schematic illustration of a balun (non-radiating structure 700) according to some example implementations as described herein.

In this example, the feeding structure 702 comprises a corrugation 704 so as for the corresponding parts to be transparent to frequency bands according to the length, width and number of protrusions.

FIGS. 8*a* to *f* show different views of a schematic illustration of parts of an antenna having radiator units 800 according to some example implementations as described herein.

In this example, a plurality of first radiating structures 802 (in this example in the form of dual-polarized loop dipoles) are provided together with a plurality of second radiating structures 804 (in this example in the form of high-band (e.g. above 1.4 GHz) dipoles). In the enlarged view shown in FIG. 8*d*, one can see that the first radiating structures 802 in this example partially cover the radiation direction of electromagnetic waves radiatable by the second radiating structures 804 located beneath the first radiating structures 802. The first radiating structures 802 comprise corresponding first corrugations, so that the first radiating structures 802 are transparent to electromagnetic waves radiatable by the second radiating structures 804. It can further be seen from, e.g., FIG. 8*e* that the first radiating structures 802 can be arranged independently from the arrangement of the second radiating structures 804, and vice versa.

The radiating structures 802 and the radiating structures 804 are provided on a reflector 820.

FIGS. 9*a* to *d* show different views of a schematic illustration of parts of an antenna with radiator units 900 according to some example implementations as described herein.

The antenna of FIGS. 9*a* to *d* generally corresponds to that shown in FIGS. 8*a* to *f*. In the antenna of FIGS. 9*a* to *d*, however, further to the first radiating structures 902 comprising corrugations (so that the first radiating structures 902 are transparent to electromagnetic waves radiatable by the second radiating structures 904), additionally, a decoupling element 905 in this example in the form of a partition wall 906 is provided which comprises a corrugation (in this example comprising a plurality of protrusions). As a result, the decoupling element is transparent to electromagnetic waves radiatable by the second radiating structures 904.

The radiating structures 902 and the radiating structures 904 together with the decoupling element 905 and the partition wall 906 are provided on a reflector 920.

It is to be noted that any one or more of the radiating structures 300, 400, 500, 600 and/or the non-radiating structure 700 may be implemented in the radiator unit 800 and/or in the radiator unit 900. Additionally or alternatively, it is further to be noted that the radiating structures 300, 400, 500, 600 may be considered or construed as a radiator unit, in particular when combined with any non-radiating structure.

According to the examples outlined throughout the present disclosure, resonance structures are not bandwidth limited, and the corrugated approach allows providing an improvement to cross-band scattering suppression over a wide bandwidth. Furthermore, the corrugated elements can be modified independently to create additional cross-band scattering suppression by introducing resonance structures. The corrugation can be applied, for example, on printed circuit boards as well as on pure metallic structures that are required to be electrically transparent for frequencies higher than their operating frequency. This is achieved since the corrugated structure is electrically scarce (transparent) for higher frequencies due to the shrinking wavelength of the incoming wave.

Some advantages of the examples outlined throughout the present disclosure are thus in particular that the corrugation structure is electrically transparent for a wide bandwidth covering multiple bands. Furthermore, multiple radiators can be stacked that are operating at different bands. Additionally, higher interchangeability of the radiators beneath is achieved since the transparency is not limited to only a narrow bandwidth. Further still, the transparent radiators can be realized symmetrically, that is in particular no distinguishing is needed between 'left' and 'right' radiators and the problem of asymmetric radiation pattern is mitigated if compared to asymmetric cross-band scattering suppression. Furthermore, the corrugation can be adapted regarding the operating frequency. Moreover, the corrugated element can be modified to create resonances for a filter behavior that allows an improved cross-band scattering suppression at specific frequencies.

The corrugation can be implemented for radiators in particular in their radiating structure(s), e.g. dipole, and/or in their non-radiating structure(s), e.g. feeding structure(s). The corrugation can be applied on different planar structures, such as for example a printed circuit board (PCB), where it is desired to reduce the cross-band interaction.

It will be appreciated that the present disclosure has been described with reference to exemplary embodiments that may be varied in many aspects. As such, the present invention is only limited by the claims that follow.

The invention claimed is:

1. A radiator unit for an antenna, wherein the radiator unit is configured to radiate electromagnetic waves within a frequency band, and wherein the radiator unit comprises:

a first radiating structure for radiating an electromagnetic wave having a first frequency within the frequency band, and a non-radiating structure coupled to the first radiating structure, wherein (i) the first radiating structure comprises a first corrugation arranged on a first planar structure of the radiator unit, and (ii) the non-radiating structure comprises a second corrugation arranged on a second planar structure of the radiator unit.

2. A radiator unit as claimed in claim 1, wherein the non-radiating structure comprises a feeding structure electrically coupled to the first radiating structure, and wherein the feeding structure is configured to provide an electrical signal to the first radiating structure for the first radiating structure to radiate the electromagnetic wave having the first frequency.

3. A radiator unit as claimed in claim 1, wherein:

the first corrugation comprises a first plurality of protrusions formed on the first planar structure, and wherein the protrusions of the first plurality of protrusions are spaced apart from and electrically coupled to each other; or the second corrugation comprises a second plurality of protrusions formed on the second planar structure, and wherein the protrusions of the second plurality of protrusions are spaced apart from and electrically coupled to each other.

4. A radiator unit as claimed in claim 3, wherein one or more of a length of the protrusions of the first and/or second plurality of protrusions, a width of the protrusions of the first and/or second plurality of protrusions, and a distance between neighboring protrusions of the first and/or second plurality of protrusions vary amongst the protrusions of the first and/or second plurality of protrusions.

5. A radiator unit as claimed in claim 3, wherein a spacing between neighboring protrusions of the first plurality of protrusions and/or the second plurality of protrusions defines a transparency of the first radiating structure and/or the non-radiating structure to an electromagnetic wave having a frequency within the frequency band.

6. A radiator unit as claimed in claim 3, wherein the radiator unit further comprises a transmission line, and wherein the protrusions of the first plurality of protrusions are electrically coupled to each other via the transmission line.

7. A radiator unit as claimed in claim 6, wherein the protrusions of the first plurality of protrusions are arranged at least partially alternately on two sides of the transmission line.

8. A radiator unit as claimed in claim 6, wherein one or both of the transmission line and the protrusions of the first plurality of protrusions have a thickness of less than 0.8 millimeter.

9. A radiator unit as claimed in claim 6, wherein one or both of the transmission line and the protrusions of the first plurality of protrusions have a thickness of less than c/(f*100), wherein c is the speed of light in vacuum, and wherein f is the first frequency or another frequency within the frequency band.

10. A radiator unit as claimed in claim 1, wherein the first corrugation comprises a first metal corrugation.

11. A radiator unit as claimed in claim 1, wherein the second corrugation comprises one or both of a second metal corrugation and a second dielectric corrugation.

12. A radiator unit as claimed in claim 1, wherein one or both of the first corrugation and the second corrugation are transparent for an electromagnetic wave having a frequency above a frequency threshold within the frequency band and are shielding for an electromagnetic wave having a frequency below the frequency threshold.

13. A radiator unit as claimed in claim 1, further comprising a resonance structure arranged on one or both of the first planar structure and the second planar structure for cross-band scattering suppression.

14. A radiator unit as claimed in claim 1, wherein one or both of the first corrugation and the second corrugation are comprised in or formed on a printed circuit board.

15. A radiator unit as claimed in claim 1, further comprising a second radiating structure for radiating an electromagnetic wave having a second frequency within the frequency band, wherein the first radiating structure is transparent to the electromagnetic wave having the second frequency and wherein the second frequency is higher than the first frequency.

16. A radiator unit as claimed in claim 15, wherein the first radiating structure and the second radiating structure are arranged such that the first radiating structure physically covers at least partially a radiation direction of the electromagnetic wave having the second frequency radiatable by the second radiating structure.

17. A radiator unit as claimed in claim 15, comprising a plurality of said first radiating structures, wherein each one of the plurality of first radiating structures comprises a corresponding, respective first corrugation, and wherein the radiating structures of the plurality of first radiating structures are arranged relatively to each other to obtain, independently from a location of the second radiating structure, a predefined radiation pattern of electromagnetic waves having the first frequency.

18. A radiator unit as claimed in claim 15, comprising a plurality of said second radiating structures, and wherein the radiating structures of the plurality of second radiating structures are arranged relatively to each other to obtain, independently from a location of the first radiating structure or radiating structures of the first plurality of radiating structures, a predefined radiation pattern of electromagnetic waves having the second frequency.

19. A radiator unit as claimed in claim 1, wherein the first radiating structure comprises one or more oval shaped radiating elements, and wherein the first corrugation is comprised in one or more of the oval shaped radiating elements.

20. A radiator unit as claimed in claim 1, wherein:

the non-radiating structure comprises a decoupling element for electromagnetically decoupling a plurality of radiating structures of the radiator unit, and wherein the decoupling element comprises the second corrugation; or the non-radiating structure comprises a partition wall for partitioning one or more radiating structures of the antenna from one or more other radiating structures of the antenna, and wherein the partition wall comprises the second corrugation.

* * * * *